United States Patent [19]
Neely

[11] Patent Number: 6,044,362
[45] Date of Patent: *Mar. 28, 2000

[54] ELECTRONIC INVOICING AND PAYMENT SYSTEM

[76] Inventor: R. Alan Neely, 5618 Faye Dr., Greensboro, N.C. 27410

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,344

[22] Filed: Sep. 8, 1997

[51] Int. Cl.[7] .................................................. G06F 17/60
[52] U.S. Cl. ............................... 705/34; 705/26; 705/27; 705/35; 705/40; 705/44
[58] Field of Search .................................. 705/34, 40, 30, 705/35, 26, 27, 44; 379/91.01, 114; 380/30; 283/58

[56] References Cited

U.S. PATENT DOCUMENTS

| | | | |
|---|---|---|---|
| 3,653,480 | 4/1972 | Yamamoto et al. | 194/4 |
| 4,322,613 | 3/1982 | Oldenkamp | 235/449 |
| 4,544,834 | 10/1985 | Newport et al. | 235/487 |
| 4,649,563 | 3/1987 | Riskin | 379/97 |
| 4,695,880 | 9/1987 | Johnson et al. | 358/86 |
| 4,711,993 | 12/1987 | Kosednar et al. | 235/380 |
| 4,713,761 | 12/1987 | Sharpe et al. | 705/30 |
| 4,859,837 | 8/1989 | Halpern | 235/380 |
| 4,870,260 | 9/1989 | Niepolomski et al. | 235/381 |
| 4,922,646 | 5/1990 | Collin | 235/375 |
| 4,947,028 | 8/1990 | Gorog | 235/381 |
| 5,097,115 | 3/1992 | Ogasawara et al. | 235/380 |
| 5,121,945 | 6/1992 | Thomson et al. | 283/58 |
| 5,168,151 | 12/1992 | Nara | 235/492 |
| 5,179,584 | 1/1993 | Tsumura | 379/114 |
| 5,220,501 | 6/1993 | Lawlor et al. | 364/408 |
| 5,283,829 | 2/1994 | Anderson | 380/24 |
| 5,317,137 | 5/1994 | Wilkins | 235/380 |
| 5,326,959 | 7/1994 | Perazza | 235/379 |
| 5,383,113 | 1/1995 | Kight et al. | 705/40 |
| 5,465,206 | 11/1995 | Hilt et al. | 705/40 |
| 5,473,143 | 12/1995 | Vak et al. | 235/380 |
| 5,483,445 | 1/1996 | Pickering | 705/40 |
| 5,504,677 | 4/1996 | Pollin | 365/408 |
| 5,544,086 | 8/1996 | Davis et al. | 365/408 |
| 5,557,518 | 9/1996 | Rosen | 365/408 |
| 5,572,004 | 11/1996 | Raimann | 235/380 |
| 5,652,786 | 7/1997 | Rogers | 379/91.01 |
| 5,671,285 | 9/1997 | Newman | 380/30 |
| 5,699,528 | 12/1997 | Hogan | 395/240 |

OTHER PUBLICATIONS

ACH Rules Guide for Direct Payment Programs; NACHA, 1995.

The Biller's Guide To Electronic Consumer Bill Payment; NACHA, 1995.

*Primary Examiner*—Eric W. Stamber
*Assistant Examiner*—M. Irshadullah
*Attorney, Agent, or Firm*—Rhodes & Mason, PLLC

[57] ABSTRACT

A system for automated electronic invoicing and payment system for providing remote customer review of automated billing from an invoicer. The system includes invoice presentment electronics having a control system and first communication electronics. The system also includes at least one remote authorization terminal having a customer interface, the terminal having second communication electronics adapted to operatively communicate with the first communication electronics. The control system of the invoice presentment electronics is adapted to provide billing data, regarding a customer invoice preauthorized for automated billing, to the first communication electronics for transmission to the second communication electronics. The customer interface of the remote authorization terminal is adapted to present the billing data to a customer and to receive a response relating to the billing data from the customer, the response indicating one of acceptance of the billing data for automated billing or modification of the billing data for modifying automated billing. Acceptance can either be an active response from the customer or a passive response, for example, automatic acceptance up to a preset limit.

99 Claims, 3 Drawing Sheets

ELECTRONIC INVOICING AND PAYMENT SYSTEM

BACKGROUND OF THE INVENTION (1) Field of the Invention

The present invention relates generally to automated billing systems and, more particularly, to an automated payment system for presenting an electronic invoice to a customer for remote review and payment.

(2) Description of the Prior Art

Invoicing and payment collection has always been a very labor intensive and paper intensive process. Typically the process has involved an invoicer, usually a business, who prepares an invoice detailing the goods and services provided and the charges therefor. The invoice is mailed to a customer who verifies the correctness of the invoice and returns a payment coupon of some type along with a paper check to the invoicer. The invoicer then submits the paper check to its bank for payment through, for example, the Automated Clearing House (ACH) network. Other similar payment systems include writing a credit card number and endorsing and preauthorization to draft an account on a monthly basis up to preset limits, such as regularly paying utility bills from a checking account.

Attempts have been made to automate this process through the use of third party service providers who receive and transmit between the invoicer and the banks involved electronic information relating to payments due from a customer. Although these systems appear to streamline the process, they, in fact, may add a great deal of complexity and no small amount of expense to the process. Such electronic systems are described in U.S. Pat. No. 5,383,113, issued to Kight et al.; U.S. Pat. No. 5,283,829, issued to Anderson et al.; U.S. Pat. No. 5,220,501, issued to Lawlor et al.; and U.S. Pat. No. 5,465,206, issued to Hilt et al., the disclosures of which are hereby incorporated by reference in their entireties.

However, paper systems require that the invoice be presented to the customer and, in addition, require that either that the customer present the paper check to the invoicer's bank either directly to the invoicer or indirectly to a lock box before payment is made from the customer's bank to the invoicer's bank.

Moreover, electronic systems require that the invoice be presented to a third party service provider and then to the customer or to the customer's bank and then to the customer and, in addition, require that the customer present the electronic payment back to the third party service provider before payment is made from the customer's bank to the invoicer's bank.

Thus, there exists a need for a simple, straight forward system and method of automated electronic invoicing and payment that directly involves the invoicer and the customer while, at the same time, does not require a third party service provider and can be customized to include pre-approved payments for invoices of a certain type or under a certain dollar threshold.

SUMMARY OF THE INVENTION

The present invention is directed to an electronic invoicing and payment system for providing customers an opportunity to review and modify payment instructions carried out by the invoicer. The system includes invoice presentment electronics having a control system and first communication electronics. The system also includes at least one remote authorization terminal having a customer interface, the terminal having second communication electronics adapted to operatively communicate with the first communication electronics.

The control system of the invoice presentment electronics is adapted to provide billing data, regarding a customer invoice preauthorized for automated billing, to the first communication electronics for transmission to the second communication electronics.

The customer interface of the remote authorization terminal is adapted to present the billing data to a customer and to receive a response relating to the billing data from the customer, the response indicating one of acceptance of the billing data for automated billing or modification of the billing data for modifying automated billing.

Accordingly, one aspect of the present invention is to provide an automated electronic invoicing and payment system for providing remote customer review of automated billing from an invoicer. The system includes: (a) invoice presentation electronics adapted to present customer billing data and to request payment instructions relating to automated billing to the customer; and (b) a remote electronic customer authorization interface adapted to: (i) receive the customer billing data and the request for payment instructions from the invoice presentation electronics; (ii) provide the customer billing data and the request for payment instructions to the customer; (iii) receive customer payment instructions from the customer in response to the request for payment instructions; and (iv) transmit the customer payment instructions from the customer to the invoicer, the payment instructions including at least an invoice account number and an associated customer payment account.

Another aspect of the present invention is to provide a remote electronic customer authorization interface for an automated electronic invoicing and payment system for providing remote customer review of automated billing from an invoicer. The system including: (a) means for receiving customer billing data and a request for payment instructions from the invoicer; (b) means for receiving customer payment instructions from the customer in response to the request for payment instructions from the invoicer; and (c) means for transmitting the customer payment instructions from the customer to the invoicer, the payment instructions including at least an invoice account number and an associated customer payment account.

Still another aspect of the present invention is to provide an automated electronic invoicing and payment system for providing remote customer review of automated billing from an invoicer. The system includes: (a) invoice presentation electronics adapted to present customer billing data and to request payment instructions relating to automated billing to the customer; (b) a remote electronic customer authorization interface, said customer interface including: means for receiving customer billing data and a request for payment instructions from the invoicer; means for receiving customer payment instructions from the customer in response to the request for payment instructions from the invoicer; and means for transmitting the customer payment instructions from the customer to the invoicer, the interface adapted to: (i) receive the customer billing data and the request for payment instructions from the invoice presentation electronics; (ii) provide the customer billing data and the request for payment instructions to the customer; (iii) receive customer payment instructions from the customer in response to the request for payment instructions; and (iv) transmit the customer payment instructions from the customer to the invoicer, the payment instructions including at least a customer invoice number and an associated customer payment account; and (c) a payment source, the invoice presentment electronics adapted to transmit the payment instructions to the payment source after customer review.

These and other aspects of the present invention will become apparent to those skilled in the art after a reading of the following description of the preferred embodiment when considered with the drawings.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
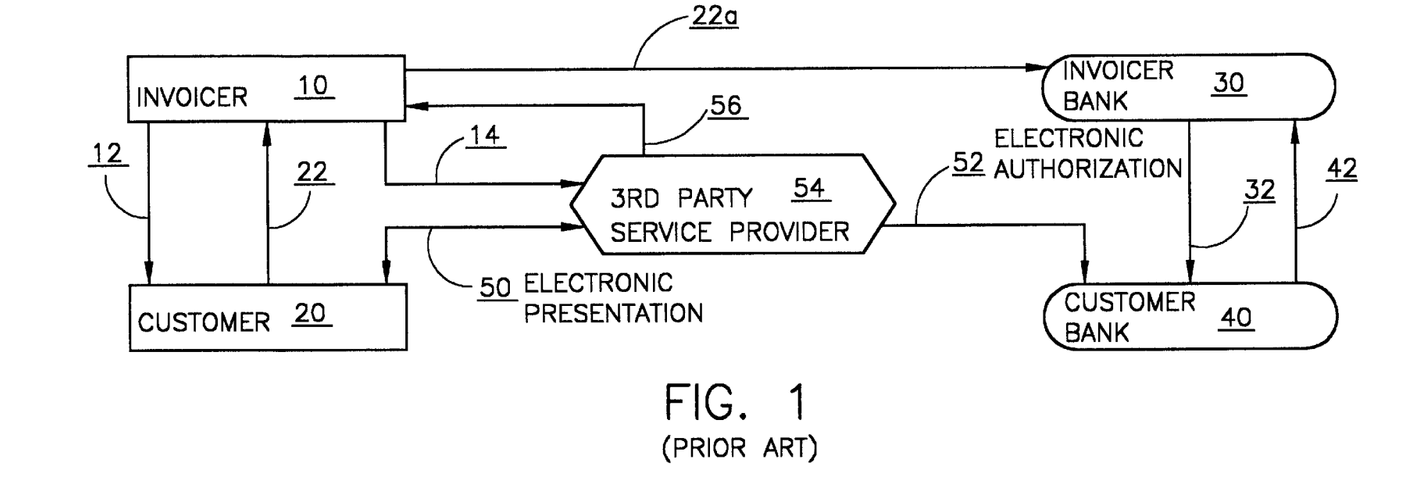
FIG. 1 is a schematic representation of various prior art invoicing systems.

Referring now to the drawings in general and FIG. 1 in particular, it will be understood that the illustrations are for the purpose of describing a preferred embodiment of the invention and are not intended to limit the invention thereto. Turning to FIG. 1, there is illustrated the current process used for paper invoice payment and automated invoice payment using a third party service provider.

In the case of the paper invoice process, an invoicer 10 prepares a paper invoice 12 which is sent via mail to customer 20. After verifying that the invoice is correct customer 20 prepares a paper check 22 and returns the paper check 22 to invoicer 10. Invoicer 10 then credits the account of customer 20 and submits check 22 with its other business receipts to invoicer bank 30. Invoicer bank 30 then interacts with customer bank 40 via the well-known ACH network to demand the funds from customer's checking account and deposit those funds into the invoicer's checking account. This interaction follows a conventional, well known process represented by 32, 42.

As discussed above, some period may elapse before invoicer 10 receives check 22 from customer 20. This process can be expedited somewhat if the check is sent directly from customer 20 to invoicer bank 30. This "lock box" process takes place through the use of a post office box address on the invoice which sends the check 22 to invoicer bank 30 even though the address on the invoice 12 may show the name of invoicer 10. In this modified process, after receiving check 22, invoicer bank 30 will still go through the ACH network 32,42 before funds are credited to invoicer's account.

In an attempt to automate this process, third party service providers 54 have entered the scene. Here invoicer 10 transmits an electronic data stream 14 to service provider 54 containing all of the information that normally is contained in a paper invoice. There is then an electronic communication 50 between service provider 54 and customer 20 for the purpose of notifying customer 20 of the pending charge and, in some cases, allowing the customer to approve of the charge against its accounts. Service provider 54 then transmits payment authorization 52 to customer bank 40. At the same time service provider 54 may also transmit a message 56 to invoicer 10 with notification of the payment authorization 52.

After receiving authorization 52, customer bank 40 then sends payment to invoicer bank 30 through conventional channels.

The non-bank service provider 54 may also be granted access to the ACH network to direct draft via PPD customer bank 40 on behalf of customer 20. In this case, service provider 54 may receive funds from the customer into the service provider checking account and then disperse those funds to invoicer 10.

As can be seen from the complexity of FIG. 1, both the conventional paper invoice process and the third party service provider process are cumbersome, and time/labor intensive.

Figure 2:
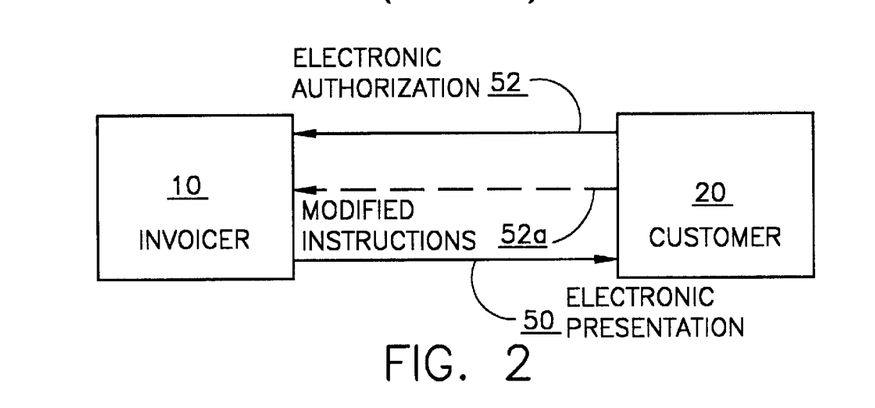
FIG. 2 is a schematic representation of a method for electronic invoicing and paying performed according to present invention.

As best seen in FIG. 2, a method for electronic invoicing and paying is shown constructed according to the present invention. The method starts with the electronic presentment 50 of an invoice to customer 20. It should be understood that the term "presentment" as used herein does not include the specialized definition normally associated with commercial paper, i.e., the production of a negotiable instrument to a drawee. Rather, the term refers to providing via electronic means an "invoice" containing at least the same customer billing data typically included on a paper invoice. This electronic presentment may take place through the use of an Internet website, a bank ATM machine or through the use of a stand alone kiosk.

In a preferred embodiment, the invoice would also include, in addition to normal billing data, a request for payment instructions. This request provides the customer the opportunity to select either the bank account from which the invoice will be paid, or it provides the customer with the option to pay via a debit card, credit card, ATM, stored value card or some source of funds.

The invoice would include billing data such as the customer name, address, account number and e-mail address. The invoice may further include bill data typically included with a paper invoice to include the period covered by the invoice, a detail of the goods/services covered by the invoice, a total amount due and a payment due date.

In addition to the typical invoice information, the electronic invoice presentment may also include customer notices relating to changes in credit terms and the like. Invoicer 10 may also include sales and promotional materials informing customer 20 of new products or sales on existing products.

After electronic invoice presentment 50, the customer provides an electronic authorization 52 to the invoicer 10 permitting customer's account to be charged. This step eliminates the time and expense of preparing and mailing a paper check. Thus, invoicer 10 could be in a position to debit customer's bank account in as little as one day as opposed to the period required to receive a paper check 22.

The information included in this electronic authorization could include the customer invoice number and an associated customer payment account. In a preferred embodiment, both these items of information are submitted simultaneously with the authorization. When pre-arranged instructions are made this information does not need to be resubmitted each time.

Prior to providing the authorization for payment, customer 20 is provided with a number of options for changing the payment instructions to create modified payment instruction 52a. These modifications can range from no modification at all in accepting all the payment terms contained in the presentment. Alternatively, customer 20 may be provided with any combination of the following options:

1) The customer may pay less than the amount due on the invoice for either unspecified reasons or for a specific reason such a dispute concerning a line item contained on the invoice.
2) The customer may elect to pay more than the amount due on the invoice.
3) The customer may elect to make a special payment, for example, an extra principal payment on a loan.
4) The customer may elect to change the date that the payment, via electronic transfer, will take place, provided that such date has not already passed.
5) The customer may change the source of funds for the payment, i.e., from a primary checking account to a pre-authorized credit card.

Making any of these changes discussed above requires that the customer be authorized to do so by the invoicer.

Figure 3A:
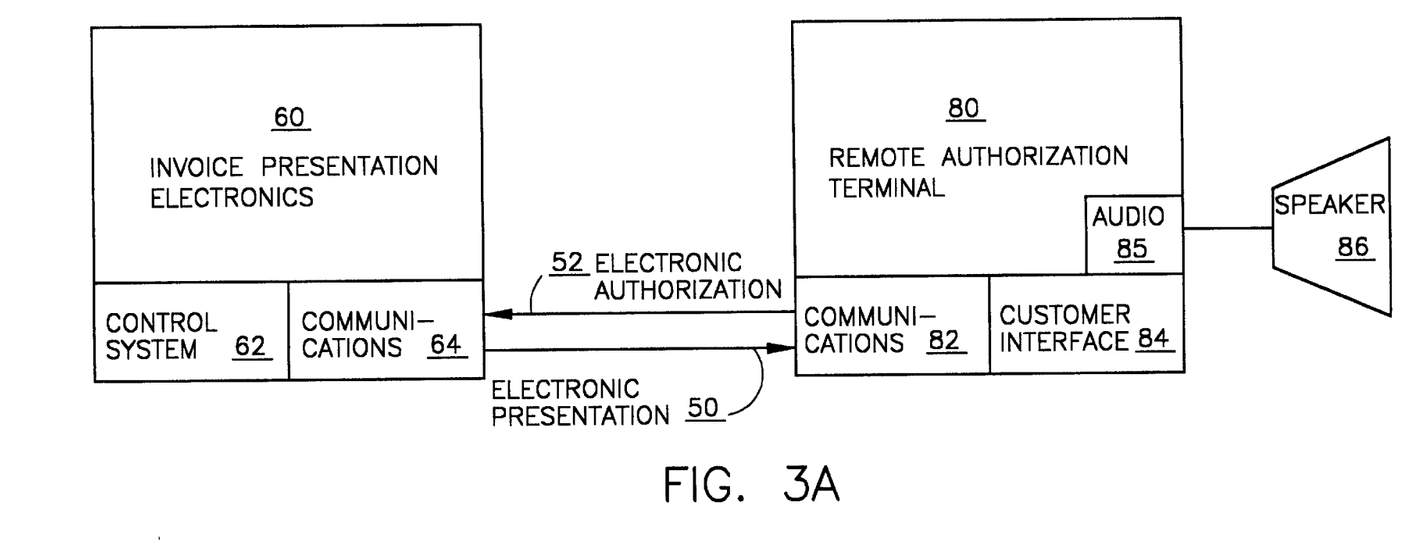
FIGS. 3A and 3B are schematic representations of an electronic invoicing and payment system constructed according to the present invention.

The method described above may be carried out by an automated billing system depicted schematically in FIG. 3A which provides remote customer review of automated billing from an invoicer to include: (a) invoice presentation electronics 60 adapted to present customer billing data in request for payment instructions related to automated billing, and (b) an electronic customer authorization interface 84.

The customer interface receives customer billing data and request for payment instructions from the invoicer presentation electronics and provides those items to the customer. The interface also receives customer payment instructions in response to the request for payment instructions and transmits those instructions from the customer to the invoicer.

The invoice presentment electronics 60 may further include a control system 62 and first communication electronics 64. These components typically are located in an invoicer controlled facility.

At a customer facility, the system includes a remote authorization terminal 80 having second communication electronics 82 adapted to communicate with first electronic communications 64. Control system 62 coordinates the generation of the electronic invoice 50 containing at least all the billing information normally included on a traditional paper invoice along with a request for payment instructions. Control system then oversees the submission of that information from the first communication electronics 64 to the second communication electronics 82 for review by the customer.

Remote authorization terminal 80 is adapted to present the billing data to a customer and to an appropriate response relating to the billing data from the customer. The response indicates acceptance of the billing data without change for automated payment or modification of the billing data as described above. The customer interface 84 is further adapted to transmit this information to invoice presentment electronics 60.

The components of this system may be configured in a number of ways. For example, the customer accessible site may reside in an Internet website provided by invoicer for receiving the billing data and payment instructions from the customer. The website will be accessible from the customer electronic authorization interface 84. In this instance, the customer authorization interface 84 would include an Internet browser for accessing the customer accessible site.

Other alternatives for the electronic customer authorization interface include an automated teller machine (ATM), a remote kiosk, a personal computer, an interactive television device, or a telephone.

In the case of a telephone, the electronic customer authorization interface 84 could include either a well-known touch-tone telephone or a screen-based telephone.

In another embodiment, the electronic consumer authorization interface 84 is a digital computer with the billing data and the payment request instructions presented by e-mail to the customer with an e-mail reply for relaying customer payment instructions 52 to the invoice presentation electronics 60. The electronic customer authorization interface 84 could also include a display for presenting billing data and the request for payment instructions along with a customer actuable input for receiving customer payment instructions.

In addition to the visual display, the electronic customer authorization interface 84 could further include audio electronics 85 and a speaker 86 for presenting billing data and request for payment instructions to the customer. In this embodiment, the customer actuable input for receiving customer payment instructions may also feature a customer-spoken input.

The electronic customer authorization interface 84 may also be adapted to allow a customer to poll the invoice presentment electronics 60 to receive billing data and payment request instructions.

The automated billing system of the present invention includes submitting billing data from an invoicer to a customer for remote customer review and acceptance/modification and the transmission of those items to the invoicer. The billing information 50 that may be submitted to the customer includes any combination of the following items:

payment due date amount due detail of goods/services provided during a billing period late charges account information customer information to include customer name, customer address, and customer account identifier (the account identifier could include a customer number and/or an account number)

invoice identifier, e.g., invoice number

The invoice presentment electronics 60 may include a memory device to store invoice information relating to customer bills and account information relating to financial institutions associated with the customer. That is, the customer may have the option of selecting from a number of accounts a specific account from which funds are drafted to pay the invoice.

The memory device and the invoice presentment electronics 60 may also include information relating to a pre-authorized payment instruction for automated payment of the billing amount set out in the billing information from an account set out in the account information. If pre-authorized payment instructions are used, the request for payment instructions 50 originating in the invoice presentment electronics 60 may query the customer for acceptance of those instructions with or without modification. To accomplish such a modification, the customer authorization interface 84 may further include an editor for modifying the pre-authorized payment instructions.

Figure 3B:
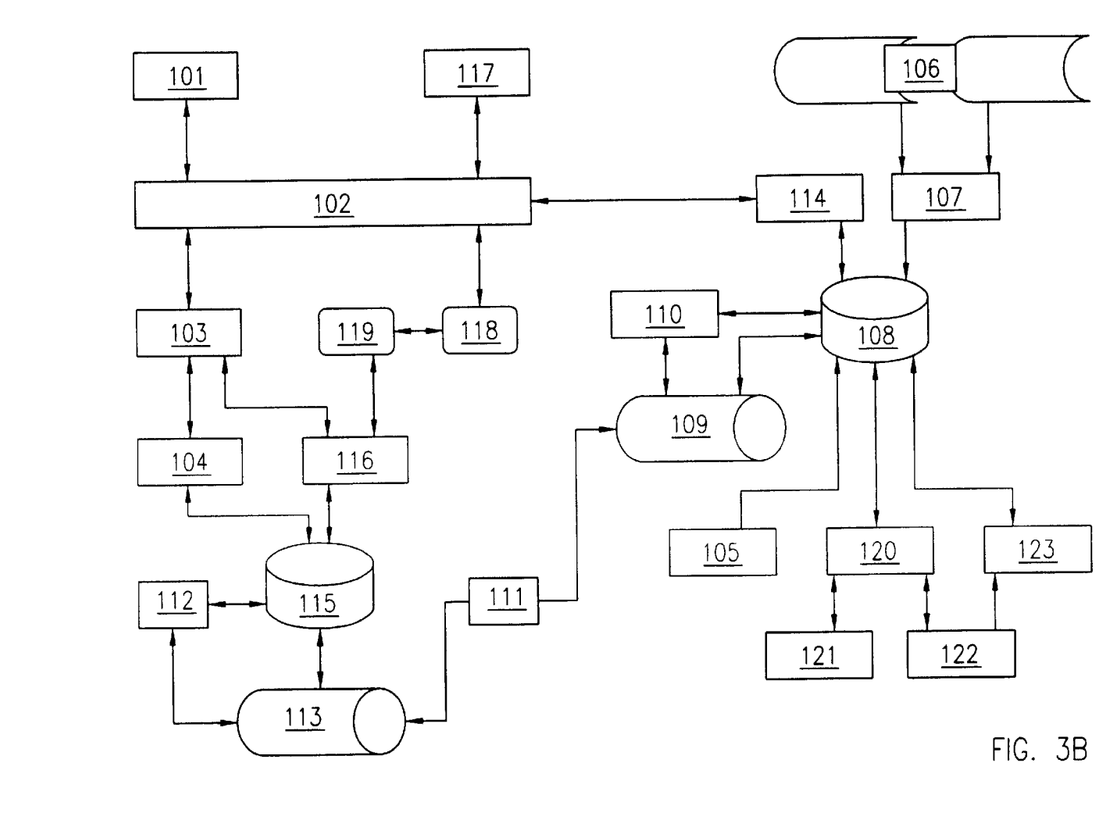

The overall operation of the present invention can best be understood by referring to FIG. 3B. The invoicer's customer can access the system through any remotely attached computing device 101 and communicates with the invoicer systems through a public or private network 102. A webserver or communications processor of some kind 103 manages on-line communications between the customer and application systems that allow the customer to begin the provisioning process. The customer is presented electronically data input forms to complete by a provisioning application program 104 which also may validate whether the data input by the customer is valid according to the invoicer's records as contained in the Legacy systems. After determining whether customer and financial account records are accurate, the invoicer activates the customer for electronic invoice presentment and remittance.

An electronic mail message or traditional letter may be sent to the customer with information that allows the customer to access the system, such as an account number and/or password.

During the next invoicing cycle for this customer, appropriate data, such as Legacy print data and Legacy automatic payment 106 is acquired. Legacy print data is data that would normally be sent to a printer to prepare customers' invoices on paper. Legacy automatic payment data are records that are typically created by the invoicer that allow the invoicer to initiate payment based on pre-authorized arrangements with the customer. Payment records would include those formatted for automatic funds transfer from checking or savings accounts (ACH format data), debit transactions to credit cards, debit cards, or stored value cards. Files intended for transfer to ATM networks are also anticipated.

In acquiring the data for the product, Legacy data is sorted, parsed, extracted by an application program 107 and appropriate control data is maintained for reporting on operations. An application program 108 loads data into a relational database 109 for monthly processing. In the preferred embodiment, two separate computers may be used for additional security over sensitive financial data such as account numbers or authorization codes. As a further security measure, the invoicer may choose to configure the product using a computer 110 located behind the invoicer's firewall security device and connected by a secured network 111 to the webserver hosting computer 112.

Invoice presentment data and subsets of data on financial arrangements are made available for presentment by transfer of data using immediate transfer, for example by way of an encrypted, remote stored procedure within the database 109 or by a batch transfer.

Once data to be made available electronically has been accurately loaded to the webserver database 113, an application program 114 sends an electronic mail message to the customer announcing the availability of the monthly invoice and providing some summary of data. Since electronic mail account data may be invalid or services might be otherwise inoperative, the application program 114 is adapted to prepare data to be sent by the US Postal Service, fax or other means. A front-end processor 115 contains a template necessary to present the invoice and default payment arrangements 116 in the manner that the invoicer desires. The webserver 103 hosts an interactive session in which the customer accesses their invoice. The customer may choose to modify pre-arranged payment arrangements. As an example, the customer may change the amount to pay, the date for payment and changing the source of funds for the payment, from a personal checking account to another invoicer-approved source, such as a credit card. These arrangements 114 are stored on the webserver database 113.

In the preferred embodiment, the customer could also use a telephone 117 connected to a network 102 and a PBX telephone processing switch 118 to pass data to and from a voice response unit 119. The customer could call into hear information about his invoice and signal changes to pre-existing arrangements, either through touch-tone entry or speech recognition. These changes are processed by the front end processor 115 and recorded in the data base just like remote-computer-based entries.

On each day that the invoicer transfers payment data to banks or financial transaction processing services, an application program 120 is executed to identify customers in the webserver database 113 that have payments scheduled. Data from the webserver is transferred for processing on the second computer 110 and combined with the data containing the pre-authorized, payment arrangements which was initially stored in the relational database 109. Based on the customer's instructions, records are modified or might be deleted and recreated if a change in funding source is requested. Data is then formatted to interface back the invoicer's Legacy systems 121, for example, simulating the normal file format for the invoicer's lockbox processing.

Data 122 is transferred to the invoicer's bank or to a third party that processes financial transactions. An application program 123 records those instances when a customer's data within a processing batch is returned for insufficient funds or incorrect account data so that the correct payment history for a customer can be maintained.

The security provisions of the product allow an exclusively invoicer-focused delivery of electronic invoice presentment and payment arrangements. Although the preferred embodiment anticipates that an invoicer may choose to outsource webserver hosting or webserver and remittance processing to an outside company on behalf of the invoicer, the service to customers would be provided so that the customer would not normally be aware that the invoicer was not actually operating the product directly.

Certain modifications and improvements will occur to those skilled in the art upon a reading of the foregoing description. It should be understood that all such modifications and improvements have been deleted herein for the sake of conciseness and readability but are properly within the scope of the following claims.

We claim:

1. An automated electronic invoicing and payment system for providing remote customer review of automated billing from an invoicer, wherein the customer payment instructions are sent from the customer directly to the invoicer, said system comprising:

(a) invoice presentation electronics adapted to present customer billing data for customer review and to request payment instructions relating to automated billing to said customer; and (b) a remote electronic customer authorization interface adapted to: (i) receive the customer billing data for customer review and the request for payment instructions from said invoice presentation electronics; (ii) provide the customer billing data for customer review and the request for payment instructions to the customer; (iii) receive customer payment instructions from the customer in response to the request for payment instructions; and (iv) transmit the customer payment instructions from the customer directly to said invoicer, said payment instructions including at least a customer invoice account number and an associated customer payment account.

2. The system according to claim 1 further including a payment source, said invoice presentment electronics adapted to transmit the payment instructions to the payment source after customer review.

3. The system according to claim 2, wherein said payment source is a clearing house.

4. The system according to claim 3, wherein said clearing house is a payment network.

5. The system according to claim 3, wherein said clearing house is a courier.

6. The system according to claim 2, wherein said payment instructions include transmission date.

7. The system according to claim 2, wherein said payment instructions include amount to draft from customer associated financial institution.

8. The system according to claim 2, wherein said payment instructions include account information associated with the customer from which to draft payment.

9. The system according to claim 2, wherein said payment instructions include account information associated with the invoicer from which to deposit payment.

10. The system according to claim 1, wherein said billing data includes invoicer billing information.

11. The system according to claim 10, wherein said billing information includes a due date.

12. The system according to claim 10, wherein said billing information includes an amount due.

13. The system according to claim 10, wherein said billing information includes a list of goods or services provided during a billing period.

14. The system according to claim 10, wherein said billing information includes a late charge.

15. The system according to claim 10, wherein said billing information includes account information.

16. The system according to claim 1, wherein said billing data includes customer information.

17. The system according to claim 16, wherein said customer information includes customer name.

18. The system according to claim 16, wherein said customer information includes customer address.

19. The system according to claim 16, wherein said customer information includes account information for the customer.

20. The system according to claim 1, wherein said billing data includes a customer account identifier.

21. The system according to claim 1, wherein said billing data includes an invoice identifier.

22. The system according to claim 1, wherein said invoice presentment electronics includes invoice information relating to customer bills and account information relating to financial institutions associated with the customer from which payments may be drafted.

23. The system according to claim 22, wherein said invoice presentment electronics further includes preauthorized payment instructions for automated payment of a billing amount set out in said billing information from an account set out in said account information.

24. The system according to claim 23, wherein the request for payment instructions from said invoice presentment electronics query the customer if the preauthorized payment instructions are desired for the billing data presented.

25. The system according to claim 23, wherein the request for payment instructions from said invoice presentment electronics query the customer if the preauthorized payment instructions need modification for the billing data presented.

26. The system according to claim 23, wherein said customer authorization interface includes an editor for modifying the preauthorized payment instructions.

27. The system according to claim 22, wherein the account information includes account information from a plurality of financial institutions and the request for payment instructions query the customer to select the financial institution from which to draft payment for an associated customer bill.

28. The system according to claim 27, wherein said invoice presentment electronics includes a preauthorized default identifying the financial institution from which to draft payment for said associated customer bill.

29. The system according to claim 28, wherein said electronic customer authorization interface is adapted to receive a customer input to accept the preauthorized default.

30. The system according to claim 28, wherein said electronic customer authorization interface is adapted to receive a customer input to modify the preauthorized default.

31. The system according to claim 1, wherein said request for payment instructions include billing information selected from the group consisting of amount due, time of payment, account from which to draft payment.

32. The system according to claim 31, wherein said customer authorization interface is adapted to modify the billing information to change one or more of the group consisting of amount due, time of payment and account from which to draft payment.

33. The system according to claim 1, wherein said billing data include notices for the customer.

34. The system according to claim 1, wherein said billing data include advertising information directed towards the customer.

35. The system according to claim 1, wherein said billing data include control information.

36. A remote electronic customer authorization interface for an automated electronic invoicing and payment system for providing remote customer review of automated billing from an invoicer, wherein the customer payment instructions are sent from the customer directly to the invoicer said system comprising:
(a) means for receiving customer billing data for customer review and a request for payment instructions from said invoicer;
(b) means for receiving customer payment instructions from the customer in response to said request for payment instructions from said invoicer; and
(c) means for transmitting the customer payment instructions from the customer directly to said invoicer, said payment instructions including at least a customer invoice account number and an associated customer payment account.

37. The system according to claim 36, wherein said payment instructions include a date to draft payment.

38. The system according to claim 36, wherein said payment instructions include a amount of invoice.

39. The system according to claim 36, wherein said invoicer provides a customer accessible site for receiving said billing data and said request for payment instructions, said site accessible from said electronic customer authorization interface.

40. The system according to claim 39, wherein said customer accessible site is an Internet site and said electronic customer authorization interface includes a browser for accessing said customer accessible site.

41. The system according to claim 39, wherein said electronic customer authorization interface is an automated teller machine.

42. The system according to claim 39, wherein said electronic customer authorization interface is a remote kiosk.

43. The system according to claim 39, wherein said electronic customer authorization interface is a personal computer.

44. The system according to claim 39, wherein said electronic customer authorization interface is an interactive television.

45. The system according to claim 39, wherein said electronic customer authorization interface is a telephone.

46. The system according to claim 39, wherein said electronic customer authorization interface is a computer, said billing data and said request for payment instructions are presented by e-mail to the customer and the customer payment instructions are provided by a customer e-mail.

47. The system according to claim 39, wherein said electronic customer authorization interface includes a display for presenting said billing data and said request for payment instructions and a customer actuable input for receiving customer payment instructions.

48. The system according to claim 39, wherein said electronic customer authorization interface includes audio electronics and a speaker for presenting said billing data and said request for payment instructions and a customer actuable input for receiving customer payment instructions.

49. The system according to claim 39, wherein said electronic customer authorization interface is adapted to allow a customer to poll said invoice presentment electronics to receive said billing data and said request for payment instructions.

50. An automated electronic invoicing and payment system for providing remote customer review of automated billing from an invoicer, wherein the customer payment instructions are sent from the customer directly to the invoicer, said system comprising:
  (a) invoice presentation electronics adapted to present customer billing data for customer review and to request payment instructions relating to automated billing to said customer;
  (b) a remote electronic customer authorization interface, said customer interface including: means for receiving customer billing data for customer review and a request for payment instructions from said invoicer; means for receiving customer payment instructions from the customer in response to said request for payment instructions from said invoicer; and means for transmitting the customer payment instructions from the customer to said invoicer, said interface adapted to: (i) receive the customer billing data for customer review and to request for payment instructions from said invoice presentation electronics; (ii) provide the customer billing data for customer review and the request for payment instructions to the customer, (iii) receive customer payment instructions from the customer in response to the request for payment instructions; and (iv) transmit the customer payment instructions from the customer directly to said invoicer, said payment instructions including at least a customer invoice account number and an associated customer payment account; and
  (c) a payment source, said invoice presentment electronics adapted to transmit the payment instructions to the payment source after customer review.

51. The system according to claim 50, wherein said payment source is a clearing house.

52. The system according to claim 51, wherein said clearing house is a courier.

53. The system according to claim 51, wherein said clearing house is a payment network.

54. The system according to claim 50, wherein said payment instructions include transmission date.

55. The system according to claim 50, wherein said payment instructions include amount to draft from customer associated financial institution.

56. The system according to claim 50, wherein said payment instructions include account information associated with the customer from which to draft payment.

57. The system according to claim 50, wherein said payment instructions include account information associated with the invoicer from which to deposit payment.

58. The system according to claim 50, wherein said billing data includes invoicer billing information.

59. The system according to claim 58, wherein said billing information includes a due date.

60. The system according to claim 58, wherein said billing information includes an amount due.

61. The system according to claim 58, wherein said billing information includes a list of goods or services provided during a billing period.

62. The system according to claim 58, wherein said billing information includes a late charge.

63. The system according to claim 58, wherein said billing information includes account information.

64. The system according to claim 50, wherein said billing data includes customer information.

65. The system according to claim 64, wherein said customer information includes customer name.

66. The system according to claim 64, wherein said customer information includes customer address.

67. The system according to claim 64, wherein said customer information includes account information for the customer.

68. The system according to claim 50, wherein said billing data includes a customer account identifier.

69. The system according to claim 50, wherein said billing data includes an invoice identifier.

70. The system according to claim 50, wherein said invoice presentment electronics includes invoice information relating to customer bills and account information relating to financial institutions associated with the customer from which payments may be drafted.

71. The system according to claim 70, wherein the account information includes account information from a plurality of financial institutions and the request for payment instructions query the customer to select the financial institution from which to draft payment for an associated customer bill.

72. The system according to claim 71, wherein said invoice presentment electronics includes a preauthorized default identifying the financial institution from which to draft payment for said associated customer bill.

73. The system according to claim 72, wherein said electronic customer authorization interface is adapted to receive a customer input to accept the preauthorized default.

74. The system according to claim 72, wherein said electronic customer authorization interface is adapted to receive a customer input to modify the preauthorized default.

75. The system according to claim 70, wherein said invoice presentment electronics further includes preauthorized payment instructions for automated payment of a billing amount set out in said billing information from an account set out in said account information.

76. The system according to claim 75, wherein the request for payment instructions from said invoice presentment electronics query the customer if the preauthorized payment instructions are desired for the billing data presented.

77. The system according to claim 75, wherein the request for payment instructions from said invoice presentment electronics query the customer if the preauthorized payment instructions need modification for the billing data presented.

78. The system according to claim 75, wherein said customer authorization interface includes an editor for modifying the preauthorized payment instructions.

79. The system according to claim 50, wherein said request for payment instructions include billing information selected from the group consisting of amount due, time of payment, account from which to draft payment.

80. The system according to claim 79, wherein said customer authorization interface is adapted to modify the billing information to change one or more of the group consisting of amount due, time of payment and account from which to draft payment.

81. The system according to claim 50, wherein said billing data include notices for the customer.

82. The system according to claim 50, wherein said billing data include advertising information directed towards the customer.

83. The system according to claim 50, wherein said billing data include control information.

84. The system according to claim 50, wherein said payment instructions include a date to draft payment.

85. The system according to claim 50, wherein said payment instructions include a amount of invoice.

86. The system according to claim 50, wherein said invoicer provides a customer accessible site for receiving said billing data and said request for payment instructions, said site accessible from said electronic customer authorization interface.

87. The system according to claim 86, wherein said customer accessible site is an Internet site and said electronic customer authorization interface includes a browser for accessing said customer accessible site.

88. The system according to claim 86, wherein said electronic customer authorization interface is an automated teller machine.

89. The system according to claim 86, wherein said electronic customer authorization interface is a remote kiosk.

90. The system according to claim 86, wherein said electronic customer authorization interface is a personal computer.

91. The system according to claim 86, wherein said electronic customer authorization interface is an interactive television.

92. The system according to claim 86, wherein said electronic customer authorization interface is a telephone.

93. The system according to claim 86, wherein said electronic customer authorization interface is a computer, said billing data and said request for payment instructions are presented by e-mail to the customer and the customer payment instructions are provided by a customer e-mail.

94. The system according to claim 86, wherein said electronic customer authorization interface includes a display for presenting said billing data and said request for payment instructions and a customer actuable input for receiving customer payment instructions.

95. The system according to claim 86, wherein said electronic customer authorization interface includes audio electronics and a speaker for presenting said billing data and said request for payment instructions and a customer actuable input for receiving customer payment instructions.

96. The system according to claim 86, wherein said electronic customer authorization interface is adapted to allow a customer to poll said invoice presentment electronics to receive said billing data and said request for payment instructions.

97. A computerized method for automated electronic invoicing and payment system for providing remote customer review of automated billing from an invoicer, wherein the customer payment instructions are sent from the customer directly to the invoicer, said method comprising the steps of:

(a) presenting customer billing data for customer review and requesting payment instructions relating to automated billing to said customer using an invoice presentation electronics; and (b) receiving the customer billing data for customer review and the request for payment instructions from said invoice presentation electronics to said customer using a remote electronic customer authorization interface; and (c) providing customer payment instructions from the customer in response to the request for payment instructions directly to said invoicer, said payment instructions including at least a customer invoice account number and an associated customer payment account.

98. A computerized method for automated electronic invoicing and payment system for providing remote customer review of automated billing from an invoicer using a remote electronic customer authorization interface, wherein the customer payment instructions are sent from the customer directly to the invoicer, said method comprising the steps of:

(a) receiving customer billing data for customer review and a request for payment instructions from said invoicer;

(b) receiving customer payment instructions from the customer in response to said request for payment instructions from said invoicer; and (c) transmitting the customer payment instructions from the customer directly to said invoicer, said payment instructions including at least a customer invoice account number and an associated customer payment account.

99. A computerized method for automated electronic invoicing and payment system for providing remote customer review of automated billing from an invoicer, wherein customer payment instructions are sent from the customer directly the invoicer, said method comprising the steps of:

(a) presenting customer billing data for customer review and requesting payment instructions relating to automated billing to said customer using an invoice presentation electronics;

(b) authorizing payment using a remote electronic customer authorization interface, said customer interface including: means for receiving customer billing data for customer review and a request for payment instructions from said invoicer, means for receiving customer payment instructions from the customer in response to said request for payment instructions from said invoicer; and means for transmitting the customer payment instructions from the customer to said invoicer, said interface adapted to: (i) receive the customer billing data for customer review and the request for payment instructions from said invoice presentation electronics; (ii) provide the customer billing data for customer review and the request for payment instructions to the customer; (iii) receive customer payment instructions from the customer in response to the request for payment instructions; and (iv) transmit the customer payment instructions from the customer directly to said invoicer, said payment instructions including at least a customer invoice account number and an associated customer payment account; and (c) transmitting the payment instructions to a payment source after customer review using said invoice presentment electronics.

* * * * *